(12) United States Patent
Moshammer (10) Patent No.: US 12,031,569 B2
(45) Date of Patent: Jul. 9, 2024

(54) SLIDING ELEMENT

(71) Applicant: igus GmbH, Cologne (DE)

(72) Inventor: Horst Moshammer, Linz am Rhein (DE)

(73) Assignee: igus GmbH, Cologne (DE)

( * ) Notice: Subject to any disclaimer, the term of this patent is extended or adjusted under 35 U.S.C. 154(b) by 429 days.

(21) Appl. No.: 17/428,907

(22) PCT Filed: Feb. 5, 2020

(86) PCT No.: PCT/EP2020/052788
§ 371 (c)(1),
(2) Date: Aug. 5, 2021

(87) PCT Pub. No.: WO2020/161150
PCT Pub. Date: Aug. 13, 2020

(65) Prior Publication Data
US 2022/0120302 A1    Apr. 21, 2022

(30) Foreign Application Priority Data
Feb. 5, 2019    (DE) .............. 20 2019 100 666.8

(51) Int. Cl.
*F16B 7/10*    (2006.01)
(52) U.S. Cl.
CPC .................... *F16B 7/105* (2013.01)
(58) Field of Classification Search
CPC ........ F16B 7/04; F16B 7/0406; F16B 7/0413; F16B 7/0426; F16B 7/10; F16B 7/14;
(Continued)

(56) References Cited

U.S. PATENT DOCUMENTS 2,886,382 A * 5/1959 Baublys ............... F16B 21/18
384/537
3,236,569 A    2/1966 Moosmann
(Continued)

FOREIGN PATENT DOCUMENTS

CN         1755153 A    4/2006
CN       102080687 A    6/2011
(Continued)

OTHER PUBLICATIONS

Chinese Patent Office, First Office Action in Application No. CN202080018588.7, Mar. 1, 2023, pp. 1-9.
(Continued)

*Primary Examiner* — Jonathan P Masinick
(74) *Attorney, Agent, or Firm* — Cahn & Samuels, LLP (57) ABSTRACT

A sliding element works with a guide system having two guide parts that can be moved relative to one another. The sliding element can be fixed to one of the guide parts by an attachment face (3) and includes, on a face opposite the attachment face (3), a sliding surface (6) so as to be slidingly supported on the other guide part. The sliding element includes a first part (I) and a second part (2) which is mounted so as to be rotatable relative thereto, which parts include a contact surface (3) for mutual support. The contact surface (7) is axially inclined in a rotational direction of the second part (2) counter to the first part (I), and the two parts (I, 2) can be locked to one another in various angular positions and the locking can be released.

17 Claims, 5 Drawing Sheets

(58) Field of Classification Search
CPC .... F16B 7/1427; F16B 7/1445; F16B 7/1463; F16B 7/149; Y10T 403/7047; Y10T 403/7049; Y10T 403/7051; Y10T 403/70625; Y10T 403/7064; Y10T 403/7066; F16C 29/001; F16C 29/123; F16C 29/126

See application file for complete search history.

(56) References Cited

U.S. PATENT DOCUMENTS

| | | | |
|---|---|---|---|
| 3,601,455 A | 8/1971 | Spieth | |
| 5,484,210 A | 1/1996 | Gallone | |
| 5,615,585 A * | 4/1997 | Chi | B62L 3/00 |
| | | | 180/24.1 |
| 8,087,685 B2 | 1/2012 | Weidner | |
| 8,636,436 B2 * | 1/2014 | Roither | F16C 29/126 |
| | | | 403/368 |
| 9,463,125 B2 * | 10/2016 | Panzer | A61G 5/1059 |
| 10,138,933 B2 * | 11/2018 | Breitfeld | F16C 25/06 |
| 2010/0126821 A1 | 5/2010 | Adams | |

FOREIGN PATENT DOCUMENTS

| | | | | |
|---|---|---|---|---|
| CN | 103458734 A | 12/2013 | | |
| CN | 104736875 A | 6/2015 | | |
| CN | 106604861 A | 4/2017 | | |
| CN | 108431435 A | 8/2018 | | |
| DE | 199 40 969 A1 | 11/2000 | | |
| DE | 10 2005 022 808 A1 | 11/2006 | | |
| DE | 10 2014 213 134 A1 | 1/2016 | | |
| DE | 10 2014 213 134 B4 | 6/2016 | | |
| DE | 20 2017 105 698 U1 | 2/2018 | | |
| EP | 0 513 697 A2 | 11/1992 | | |
| EP | 0533399 A1 * | 3/1993 | | |
| EP | 1683975 A1 * | 7/2006 | | F16B 7/0413 |
| EP | 3508092 A1 * | 7/2019 | | |
| FR | 2840038 A1 | 11/2003 | | |
| JP | 2003-42154 A | 2/2003 | | |
| WO | WO-2007115598 A1 * | 10/2007 | | B65H 49/16 |
| WO | 2016/029896 A1 | 3/2016 | | |

OTHER PUBLICATIONS

European Patent Office, English abstract of CN106604861A, printed on May 9, 2023.
European Patent Office, English abstract of CN102080687A, printed on May 9, 2023.
European Patent Office, English abstract of CN103458734A, printed on May 9, 2023.
European Patent Office, English abstract of CN104736875A, printed on May 9, 2023.
European Patent Office, English abstract of CN108431435A, printed on May 9, 2023.
European Patent Office, English abstract of CN1755153A, printed on May 9, 2023.
European Patent Office, English abstract of FR2840038A1, printed on May 9, 2023.
European Patent Office, English abstract of JP2003042154A, printed on May 9, 2023.
The International Bureau of WIPO, English translation for International Preliminary Report on Patentability for PCT Application No. PCT/EP2020/052786, Aug. 10, 2021, pp. 1-7.
European Patent Office, Written Opinion for PCT Application No. PCT/EP2020/052786, May 29, 2021, pp. 1-7.
European Patent Office, International Search Report for PCT Application No. PCT/EP2020/052786, May 29, 2021, pp. 1-3.
European Patent Office, English Abstract for DE19940969 A1, printed on Jul. 14, 2021.
European Patent Office, English Abstract for EP0513697 A2, printed on Jul. 14, 2021.

* cited by examiner

SLIDING ELEMENT

BACKGROUND OF THE INVENTION/FIELD OF THE INVENTION

The invention concerns a sliding element for a guide system having two guide portions which are movable relative to each other, wherein the sliding element can be fixed with a fixing side to one of the guide portions and at the side opposite the fixing side has a sliding surface for slidingly bearing against the other guide portion.

BRIEF SUMMARY OF THE INVENTION

The sliding element is to be suitable in particular for guiding two profiles relative to each other in the longitudinal direction, with the possibility of subsequently correcting tolerance-induced guidance play by simple adjustment.

The guide systems which can be considered here are inter alia square tube guides, telescopic systems, lift columns of any sizes, telescopic cranes and lift trucks with telescopic columns.

The object of the invention is to provide a sliding element for a guide system which permits easy assembly between the guide portions which are movable relative to each other and simple subsequent adjustment of a tolerance-induced guidance play.

According to the invention that object is attained in that the sliding element has a first portion and a second portion which are mounted rotatably relative to each other about an axis of rotation and have a contact surface for the two portions to bear against each other, wherein the contact surface has an axial inclination in a direction of rotation of the second portion relative to the first portion about the axis of rotation so that by rotation of the two portions relative to each other the overall axial structural height of the two portions which bear against each other at the contact surface is variable and the two portions upon relative rotation thereof about the axis of rotation along their contact surface can be arrested to each other over an adjustment angle in various angular positions and the arresting action is releasable, wherein the fixing side of the sliding element for fixing to one of the guide portions is arranged at a side of the first portion, that faces away from the second portion, and the sliding surface of the sliding element is arranged at a side of the second portion, that faces away from the first portion.

In particular, it is provided that the axial overall structural height of the two portions does not alter upon release of the arresting means.

The fixing side and/or the sliding surface of the sliding element can be provided at the side of the first portion, that faces away from the second portion, or at the side of the second portion, that faces away from the first portion. In this configuration, the sliding element can comprise not more than two portions and can therefore be of a particularly simple construction.

The fixing side and/or the sliding surface of the sliding element however can also each be provided on a further component which is arranged at the side of the first portion, facing away from the second portion, or the side of the second portion, facing away from the first portion.

In particular, the material forming the sliding surface can be a plastic material with suitable tribological properties. The sliding element thus permits lubricant-free sliding guidance and is thereby clean and involves a low level of maintenance.

The material on the fixing side of the first portion also preferably consists of plastic so that simple fixing means can be formed thereon for fixing the first portion to the guide portion in question.

In particular the first portion and the second portion and/or when using a further component having the sliding surface and/or the fixing side the component, are made from plastic.

The arresting action for the two portions in the various angular positions can be implemented in such a way that it is releasable in any angular position from the exterior, in particular from the fixing side and/or the side having the sliding surface.

The axis of rotation of the two portions which are mounted rotatably relative to each other preferably extends perpendicularly to the sliding surface and to the fixing side of the sliding element. In special design configurations of the sliding element according to the invention however it can also extend at an angle different from 90° and different from 0° relative to the sliding surface and/or the fixing side of the sliding element.

The portions forming the sliding element can be of a disk-shaped configuration and can be mounted rotatably relative to each other by a cylindrical guide at their outer edge regions.

For fixing the first portion to one of the guide portions the first portion can have two resilient bars and in their free end regions a respective outwardly extending stud which is respectively latchable into a corresponding recess in the guide portion.

The adjustment angle which extends over the various angular positions in which the two portions can be arrested in their relative rotation about the axis of rotation is preferably greater than 100°.

The number of angular positions is preferably greater than five, in particular between seven and twelve.

Adjacent angular positions are preferably spaced from each other by equal angles.

The contact surface between the two portions can have a plurality of inclination regions which have the axial inclination. They can adjoin each other in the direction of rotation of the second portion relative to the first portion about the axis of rotation or they can be distributed separately from each other. The inclination regions can start from the same level and involve the same inclination height.

To achieve an adjustment which is as finely staged as possible the adjustment angle which extends over the various angular positions should be as large as possible. The size of the adjustment angle is however to be such that with the greatest possible setting of the axial overall structural height of the two portions there is still sufficient contacting along the contact surface of the two portions, which carries loadings acting on the sliding element from the outside and which also approximately corresponds to the operative wearing surface of the sliding surface of the sliding element. For regions of the sliding surface which are not in the region of the flow of pressure loading can escape the pressure by flexing so that the regions directly opposite the contact surface have to carry to a large part the loading proportion with an assumed constant distribution of the regions which are disposed apart.

In addition, the size of the adjustment angle is established by the number of axial inclination regions over the perimeter with respect to the axis of rotation. In the case of an individual axial inclination region which rises over the periphery of 360°, in the case of an increasing axial overall structural height of the portions, there is a contact region which is arranged non-symmetrically with respect to the sliding surface of the sliding element. In that way in applications for example with two oppositely disposed sliding elements in which moments acting from the exterior are to be supported, that affords an unfavorable effective support spacing which can carry those moments.

Therefore such a situation of use, can be attained with inclination regions arranged symmetrically over the periphery with respect to the axis of rotation, thereby affording a plurality of contact regions which are distributed symmetrically with respect to the sliding surface and which ensure a support spacing which is as great as possible, in relation to moments, with a correctly selected rotational orientation.

In particular there can be provided two inclination regions which respectively extend in mutually adjoining relationship through 180° in the direction of rotation, wherein the contact region of the two portions along each inclination region in each angular position extends at least over 20°, preferably over at least 60°. In that structure between seven and ten distribution stages can be implemented without the stability of the arresting effect being at risk.

In a preferred embodiment of the invention the first portion of the sliding element on a partial circle with respect to the axis of rotation has depressions or raised portions which co-operate with a projection and a depression respectively on an elastic element arranged non-rotatably on the second portion for releasably arresting the two portions in the various angular positions by a positively locking engagement.

The elastic element can be formed in one piece on the second portion.

The depressions or raised portions of the first portion and the projection or the recess on the elastic element of the second portion can be arranged axially with respect to the axis of rotation of the two portions, wherein the elastic element can be releasable from its engagement into one of the depressions or raised portions on the partial circle of the first portion by bending in the axial direction.

That positively locking connection can be released by a tool, in certain installation positions even without a tool, from the side of the sliding surface, by a pulling force causing bending of the elastic element and/or from the fixing side of the sliding element by a pressure force causing bending of the elastic element, on the elastic element. In the unlocked position the angular position of the second portion can be adjusted with respect to the first portion and thus the overall structural height of the sliding element can be adjusted, with the tool, in certain installation positions even without a tool.

For that purpose the second portion at the side having the sliding surface can have an opening and the elastic element can extend in or beneath the opening and at its free end can have a projection or the depression so that by applying a pulling force from the side of the sliding surface the positively locking connection can be unlocked.

At its end opposite the projection or the depression the elastic element can be fixed at the edge of the opening, in particular being formed there in one piece.

In addition, the opening of the second portion can be in the form of an axial through opening and the first portion can have a through opening aligning with the through opening in the second portion so that the positively locking connection can also be unlocked from the fixing side by utilizing a pressing force on the elastic element, that causes bending of the elastic element.

In particular, the opening or through opening in the second portion can be in the form of an opening or through opening which is central with respect to the axis of rotation. In that case the elastic element can extend along a central line intersecting the axis of rotation, through the opening or through opening. The through opening of the second portion and the through opening of the first portion can be provided concentrically in relation to the axis of rotation.

To achieve a finely staged adjustment over the adjustment angle the radius of the partial circle having the depressions or raised portions of the second portion should be as large as possible relative to its extent perpendicularly to the axis of rotation. It may therefore be appropriate to provide a recess in the edge region of the opening in the second portion, into which the elastic element extends with its free end and the projection arranged thereon or the depression arranged there.

Preferably the recess in a region of the contact surface having the inclination is arranged with the largest possible axial height in order to permit bending of the elastic element over a relatively great distance. In that respect the height of the projection or the depth of the depression at the free end of the elastic element can be of such a size that this affords a positively locking connection of the greatest possible stability upon arresting of the two portions in the angular positions.

The elastic element can have an engagement opening into which a tool can be inserted for exerting an axial pressing force or pulling force on the elastic element for the purposes of unlocking the positively locking connection and for rotating the second portion relative to the first portion for the purposes of adjusting the angular position.

The engagement opening can be provided in the form of a through opening in the elastic element so that by means of a suitable tool, it is possible to exert both an axial pressing force and also, when engaging the tool through the engagement opening and the undercut configuration thereof, a pulling force, on the elastic element.

The engagement opening can be in particular in the form of a central opening with respect to the axis of rotation in the elastic element.

At the side of the elastic element, that faces away from the fixing side of the sliding element, the central engagement opening can have a recess which is in the shape of a sector of a circle in relation to the axis of rotation and which at least in its radial side regions has axially directed abutment surfaces at its bottom. The free end of a tool which has a radial projection adapted to the radius of the circular sector of the recess can engage into the engagement opening. After rotation of the tool with the projection over one of the axial abutment surfaces at the bottom of the recess a pressing force causing bending of the elastic element can be exerted on the elastic element to unlock the positively locking connection, from the fixing side of the sliding element, by the tool which is passed through the through opening in the first portion. Alternatively the pressing force can also be exerted on the elastic element by a further radial projection on the tool, that is spaced at the level of the recess from the free end of the tool. In the unlocking position of the elastic element exerting a pressing force on one or other radial side wall of the recess makes it possible to move the elastic element and with it the second portion with respect to the first portion into another angular position.

The engagement opening can have an axial through-passage region for the free end of the tool for the purposes of same engaging therethrough from the side having the sliding surface to exert a pulling force on the elastic element. If, as described above, the free end of the tool is provided with a radial projection and the axial through-passage region is designed in accordance with the cross-section-sectional geometry of the free end of the tool then in the region of the recess which is in the shape of a sector of a circle of the engagement opening, by rotation of the tool, the radial projection can engage over the one or other axial abutment surface at the bottom of the recess and by subsequently applying a pulling force by the radial projection on the axial abutment surface bending of the elastic element and unlocking of the positively locking connection can be implemented. By subsequently applying a rotational force to the radial side wall of the recess in the shape of a sector of a circle, that adjoins the axial abutment surface, the second portion can be displaced with respect to the first portion into another angular position.

For the purposes of applying in symmetrical relationship with the axis of rotation the pressing and pulling forces as well as the rotational forces in the central engagement opening of the elastic element a second recess which is in the shape of a sector of a circle and which is radially opposite the recess in the shape of a sector of a circle can be provided in the engagement opening at the side of the elastic element, that faces towards the fixing side. The second recess can be of a mirror-image configuration with respect to the plane containing the axis of rotation, perpendicularly to the direction in which the elastic element extends.

Corresponding to that configuration of the engagement opening in the elastic element the tool can have at its free end two oppositely disposed radial projections with which the axial abutment surfaces of the oppositely disposed recesses can be acted upon and with which a rotational force can be exerted in one direction of rotation or the other on the opposite radial side surfaces of the oppositely disposed recesses in the shape of a sector of a circle.

Such an engagement tool is also subject-matter of the present invention.

The engagement tool can have a bar-shaped region with a handle portion arranged thereon. At the free end region opposite the handle portion there can be at least one radial projection. Preferably there are two radially opposite projections. It is also possible to consider three or more radial projections, wherein adjacent projections are preferably at the same spacing and are thus distributed uniformly about the axis of the bar-shaped region. The bar-shaped region can be in the shape of a cylinder.

The projection or projections can be formed in the region of smaller radius formed by the step-shaped reduction in the above-described arrangement. The diameter of the bar-shaped region can be so selected that it is larger than the diameter of the axial through-passage region of the engagement opening of the elastic element so that a pressing force can be exerted on the elastic element from the side of the sliding element, that has the sliding surface, by the step-shaped reduction. When the step-shaped reduction acts on the surface of the elastic element the axial spacing of the radial projections at the free end of the tool is to be of such a dimension that the projections engage into the region of the recess in the shape of a sector of a circle, at the side of the elastic element facing towards the fixing side of the sliding element, and in same, as described above, can be moved against the one or other radial side wall of the recess in the shape of a sector of a circle, by rotation of the tool.

According to the invention sliding elements as described hereinafter can be mounted between two guide portions of a telescopic guide arrangement, that are for example in the form of square tubes.

In a first step, preferably in a first end region of the inner telescopic part at a guide wall or a plurality of guide walls a sliding element according to the invention is respectively fixed with its fixing side at the inner telescopic part and the inner telescopic part with the slide element or elements fixed thereto is pushed into the outer telescopic part.

In a second step, a first sliding element with its sliding surface is placed on a side wall of the inner telescopic part between the second end region of the inner telescopic part, that is opposite to the first end region, and the outer telescopic part, and pushed into the outer telescopic part until the fixing position for fixing the sliding element with its fixing side to the outer telescopic part is reached. Thereupon fixing of the sliding element is effected at the outer telescopic part. In the above-described embodiment for that purpose the stud arranged on the resilient bars of the first portion of the sliding element is latched into corresponding recesses in the other telescopic part in the fixing position. Then a further sliding element which is placed with its sliding surface on a further side wall of the inner telescopic part is pushed in between the second end region of the inner telescopic part and the outer telescopic part until the fixing position for that sliding element on the outer telescopic part is reached. The second sliding element is thereupon fixed at the outer telescopic part like the first sliding element.

Optionally further sliding elements, for example a third and a fourth sliding element, can be fixed to the outer telescopic part, as described hereinbefore for the first and second sliding elements.

Under some circumstances a plurality of sliding elements can be placed with their sliding surface on the second end region of the inner telescopic part with their sliding surfaces and pushed into the outer telescopic part until the fixing position for fixing the sliding elements with their fixing sides on the telescopic part is reached.

In the above-described embodiment provided in the region of the sliding elements disposed in their fixing position are through openings in the outer telescopic part, through which a tool can be inserted with its engagement end from the exterior into the engagement opening in the elastic element for unlocking the positively locking connection and rotating the second portion of the sliding element into another angular position.

The sliding elements fixed to the inner telescopic part can be displaced with the inner telescopic part into a position within the outer telescopic part in which the engagement openings in the elastic elements of the sliding elements are arranged in alignment with further through openings in the outer telescopic part. In that position the overall structural height of the respective sliding element fixed at a longitudinal side of the inner telescopic part can be adjusted by a tool being inserted with its engagement end through the through opening in the outer telescopic part from the exterior into the engagement opening in the elastic element. As described hereinbefore the positively locking connection can be unlocked by exerting a pulling force causing bending of the elastic element and the overall structural height of the sliding element can be adjusted by rotation of the tool.

The above-described guide system with the sliding elements mounted therein and the above-described mounting of the guide system with the sliding elements according to the invention are also subject-matter of the present invention.

BRIEF DESCRIPTION OF THE DRAWINGS

Embodiments of the sliding elements according to the invention, the adjustment of the overall structural height of the sliding element and fixing of the sliding elements according to the invention to guide portions of a guide system are described in greater detail hereinafter with reference to the drawing.

In the drawing.

DETAILED DESCRIPTION OF THE INVENTION

Figures 1, 2:
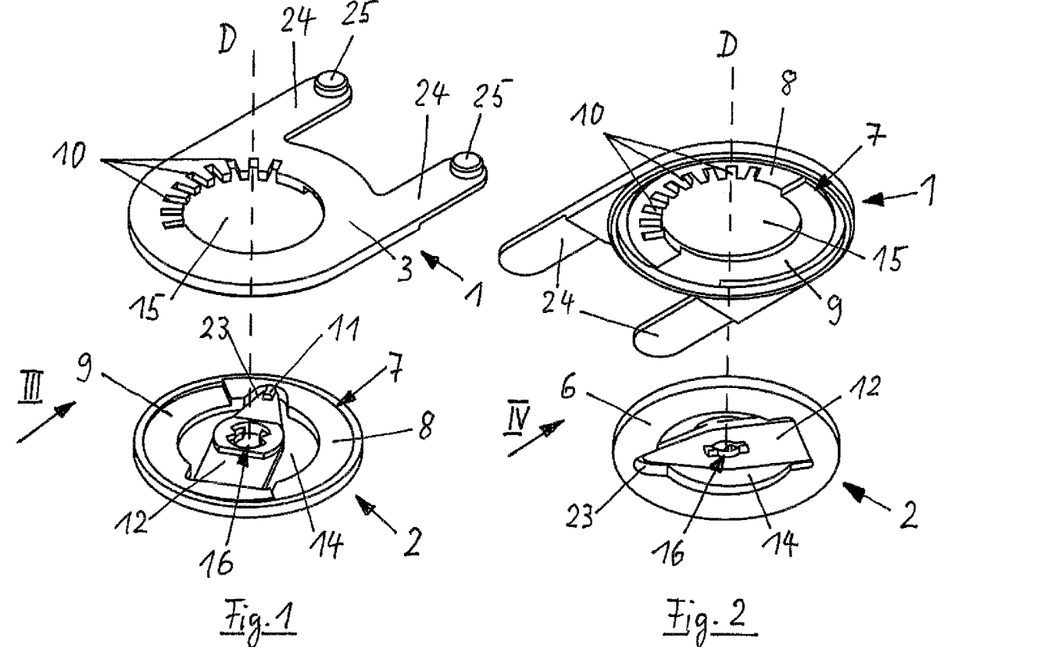
FIG. 1 shows the first portion and the second portion of a sliding element in an axially separate position as a perspective view on to the fixing side of the sliding element.
FIG. 2 shows the first portion and the second portion of the sliding element in an axially separate position as a perspective view on to the sliding surface of the sliding element.
Figure 3:
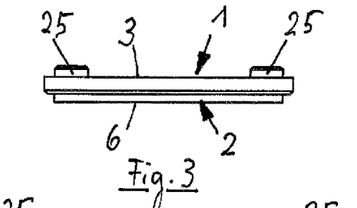
FIG. 3 shows a side view in the direction of the arrow III in FIG. 1 on to the sliding element composed of the first portion and the second portion with the angular position of the two portions as shown in FIG. 1.
Figure 4:
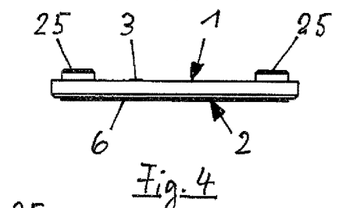
FIG. 4 shows a side view in the direction of the arrow IV in FIG. 1 on to the sliding element composed of the two portions with the angular position of the two portions as shown in FIG. 1.
Figure 5:
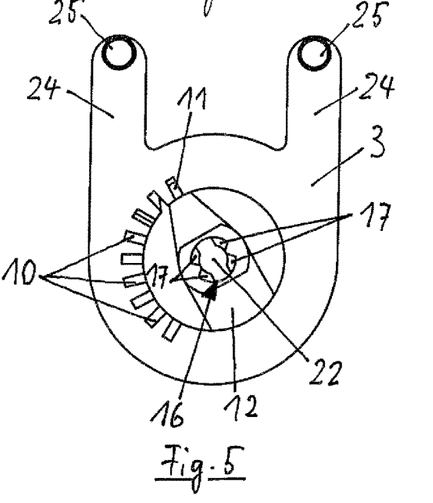
FIG. 5 shows a plan view of the fixing side of the sliding element with the angular position of the two portions as shown in FIG. 1.
Figure 6:
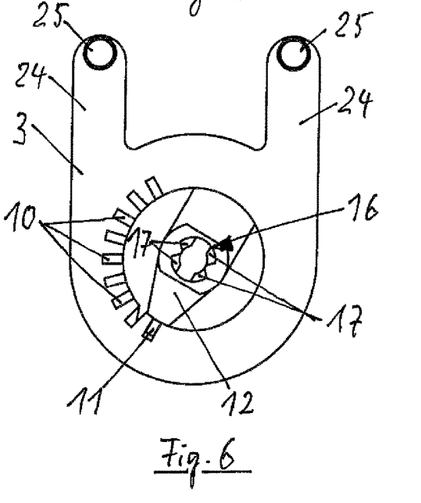
FIG. 6 shows a plan view of the fixing side of the sliding element with the angular position of the two portions as shown in FIG. 2.

As can be seen in particular from FIGS. 1 and 2 the sliding element comprises a first portion 1 and a second portion 2. The first portion has a fixing side 3 for fixing to a first guide portion of a guide system, for example the inner square tube 4 shown in FIGS. 11-15 and/or the outer square tube 5. At a side opposite the fixing side 3 of the first portion 1 the second portion 2 has a sliding surface 6 for bearing slidingly against a second guide portion movable relative to the first guide portion.

The second portion 2 having the sliding surface 6 is made from a plastic material with suitable tribological properties. The two portions 1 and 2 are of a disk-shaped configuration and are mounted rotatably relative to each other about an axis of rotation D. A cylindrical guide is provided at the outer edge regions of the two portions 1 and 2 to provide for the rotatable mounting. The cylindrical guide has a positively locking relationship to prevent separation of the two portions 1 and 2 in the axial direction with respect to the axis of rotation.

The two portions 1 and 2 have a contact surface 7 for mutual contact of the two portions 1 and 2, wherein the contact surface 7 has an axial inclination in a direction of rotation of the second portion 2 with respect to the first portion 1 about the axis of rotation D so that the axial overall structural height of the two portions 1 and 2 bearing against each other at the contact surface 7 can be varied by rotation of the two portions 1 and 2 relative to each other. The contact surface 7 has two inclination regions 8 and 9 each of 180° which adjoin each other in the perimeter around the axis of rotation, start from the same level and have the same overall inclination height.

On a partial circle with respect to the axis of rotation D the first portion has a plurality of depressions 10 which cooperate with a projection 11 on an elastic element 12 arranged non-rotatably on the second portion 2 for forming a releasable positively locking connection in the two directions of rotation about the axis of rotation D of the two portions 1 and 2 in various angular positions defined by the depressions 10. The depressions in the first portion 1 and the projections on the elastic element 12 of the second portion 2 are arranged axially in relation to the axis of rotation of the two portions 1 and 2, wherein the elastic element 12 is releasable from its engagement into one of the depressions 10 by bending in the axial direction.

The positively locking connection can be unlocked by a tool 13, as shown in FIGS. 7-10, from the side of the sliding surface 6 of the second element 2 by a pulling force causing bending of the elastic element 12 and from the fixing side of the first portion 1 of the sliding element by a pressing force on the elastic element 12, causing bending of the elastic element 12. In the unlocking position the angular position of the second portion 2 with respect to the first portion 1 and thus the overall structural height of the sliding element can be adjusted with the tool 13.

For that purpose the second portion 2, at the side having the sliding surface 6, can have a through opening 14 which is central with respect to the axis of rotation D, wherein the elastic element 12 extends along a centre line through the through opening 14, that intersects the axis of rotation D, and at its free end has the projection 11 in such a way that the positively locking engagement can be unlocked by exerting a pulling force from the side of the sliding surface 6.

The first portion 1 has a through opening 15 aligned with the through opening 14 in the second portion 2 so that the positively locking connection can also be unlocked from the fixing side 3 of the first portion 1 by exerting a pressing force on the elastic element 12, that causes bending of the elastic element 12.

For that purpose the elastic element 12 has an engagement opening 16 which is central with respect to the axis of rotation and into which the tool 13 can be inserted for exerting the axial pressing force or pulling force on the elastic element 12. At the side of the elastic element 12, that faces towards the fixing side 3 of the first portion 1, the engagement opening 16 has two radially opposite recesses in the shape of a sector of a circle and which have axially directed abutment surfaces 17 at their bottom, in their radial side regions.

Figure 7:
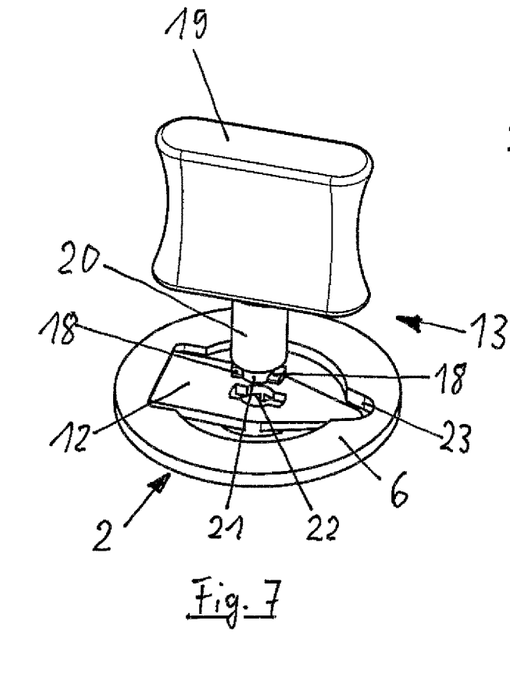
FIG. 7 shows a perspective view illustrating the feed of a tool from the side of the second portion, that has the sliding surface, to the engagement opening of the elastic element.

As FIG. 7 in particular shows the free end of the tool 13 has two opposite radial projections 18, the radial extent of which matches the radius of the recesses in the shape of a sector of a circle.

As can be seen in particular from FIG. 7, the tool 13 has a handle portion 19 and a bar-shaped region 20 extending from the handle portion 19 to the free end. Adjoining the bar-shaped region 20 by way of a stepped radial reduction is a cylindrical region 21 which extends to the free end and which is of smaller diameter than the bar-shaped region 20. At the free end thereof the opposite radial projections 18 are arranged at an axial spacing relative to the radial reduction in the bar-shaped region 20.

Figure 8:
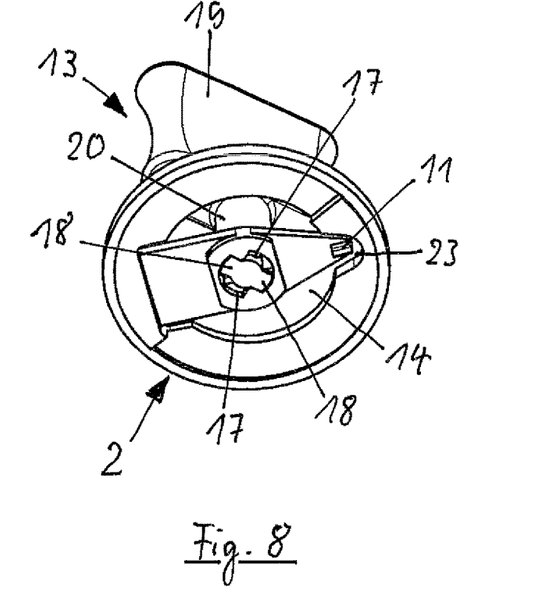
FIG. 8 shows a perspective view illustrating the engagement position of the tool in the engagement opening of the elastic element shown in FIG. 7 on the side of the second portion opposite the sliding surface.

An axial through-passage region 22 is provided in the engagement opening 16 of the elastic element 12, starting from the two opposite recesses in the shape of a sector of a circle, to the side of the elastic element 12, that faces towards the sliding surface 6. The cross-section of the through-passage region 22 is adapted to the cross-section of the free end of the tool 13 at the free end thereof with the cylindrical region 21 and the radial projections 18 formed thereon. The spacing between the radial projections 18 and the stepped reduction in the bar-shaped region 20 of the tool 13 is equal to or larger than the axial extent of the region 22 in the engagement opening 16 of the elastic element 12. The free end of the tool 13, as shown in FIG. 7, can be passed through the through-passage opening 22 from the side of the second portion 2, that has the sliding surface 6 so that the two radial projections 18 engage into the region of the recesses in the shape of a sector of a circle at the other side of the elastic element 12. In that position the tool can be rotated about the axis of rotation D in one direction or the other so that the radial projections 18 pass under the abutment surfaces 17 of the recesses in the shape of a sector of a circle, as shown in FIG. 8. By exerting a pulling force against the abutment surfaces 17 by means of the tool 13, the positively locking relationship between the two portions 1 and 2 can be unlocked by bending the elastic element 12 in the direction of the pulling force. By simultaneously or subsequently exerting a rotational force by means of the tool 13, in which the projections 18 act against the radial side surfaces of the recesses in the shape of a sector of a circle, the elastic element 12 can be rotated with the second portion 2 out of the set angular position into another angular position and thereby the overall structural height of the sliding element can be adjusted.

Figure 9:
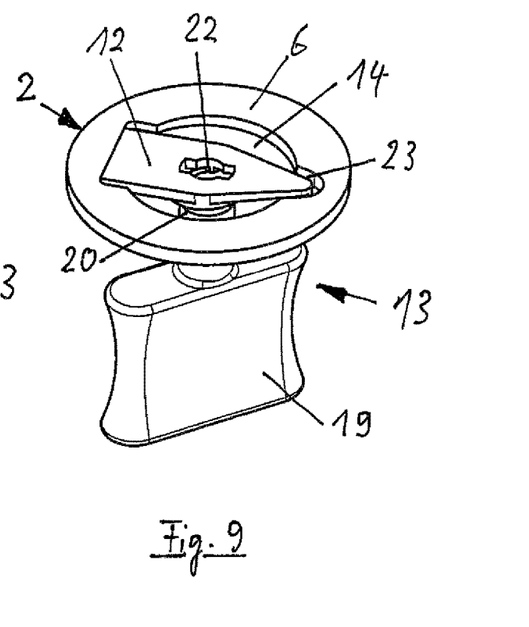
FIG. 9 shows a perspective view illustrating the feed of the tool into the engagement opening in the elastic element from the side of the second portion opposite the sliding surface, on to the side of the second portion having the sliding surface.
Figure 10:
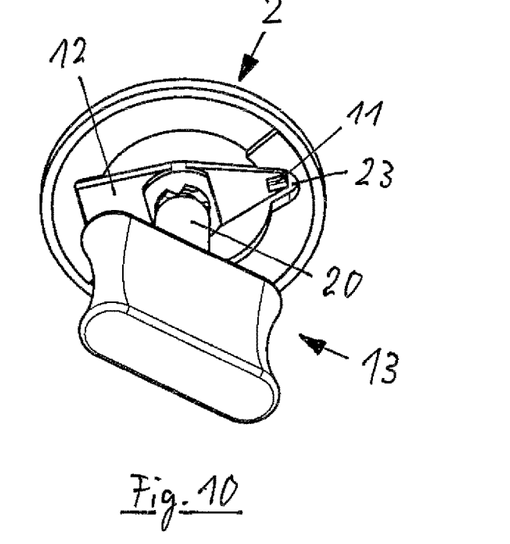
FIG. 10 shows a perspective view illustrating the engagement of the tool into the engagement opening in the elastic element of FIG. 9 and exerting a pressing and rotational force, on the side of the second portion opposite the sliding surface.

Equally, as shown in FIGS. 9 and 10, adjustment of the overall structural height of the sliding element can be implemented by the tool 13 from the side opposite the sliding surface 6, from the fixing side 3 of the sliding element. For that purpose the tool is passed through the through opening 15 in the first portion 1 to the engagement opening 16 of the elastic element, as shown in FIG. 9. By applying force to the axial abutment surfaces 17 of the two recesses in the shape of a sector of a circle with the radial projections 18 or by applying force to the elastic element 12 with the radial reduction in the bar-shaped region 20 of the tool 13 an axial pressing force can be exerted on the elastic element so that it bends in the direction towards the sliding surface 6 and the positively locking connection between the projection 11 on the elastic element 12 and the depression 10 in the set angular position in the first portion 1 can be unlocked. Therefore, by rotation of the tool and abutment of the radial projections 18 against the radial side walls of the recesses in the shape of a sector of a circle it is also possible to set another angular position between the two portions 1 and 2 and to alter the overall structural height of the sliding element.

As can be seen from FIGS. 1-10, a radial recess 23 is provided in the edge region of the central opening 14 of the second portion 2, with the elastic element 12 extending with its free end and the projection 11 arranged thereon into the opening. The radial recess 23, as shown in FIG. 1, is arranged in a region of the contact surface 7 of a greater axial height in order to permit bending of the elastic element 12 over a greatest possible distance. In that case the height of the projection 11 and the depth of the depression 10 in the first portion 1 are of such a size that this gives a positively locking connection that is as stable as possible between the two portions in the angular positions.

The elastic element 12 is formed in one piece in the through opening 14 in the second portion.

For fixing the first portion 1 to a square tube 4 and 5 shown in FIGS. 11-15 the first portion 1 is provided with two resilient bars 24 which are of a smaller thickness than the remaining region of the portion 1 and in the free end regions of which is arranged a respective stud 25 extending outwardly on the fixing side 3 at the inside thereof. The bars 24 form one plane with the fixing side 23. The studs 25 are of a press stud-like configuration so that they are latchable into corresponding recesses 26, as shown in FIGS. 11-15, in the outer square tube 5.

Figure 11:
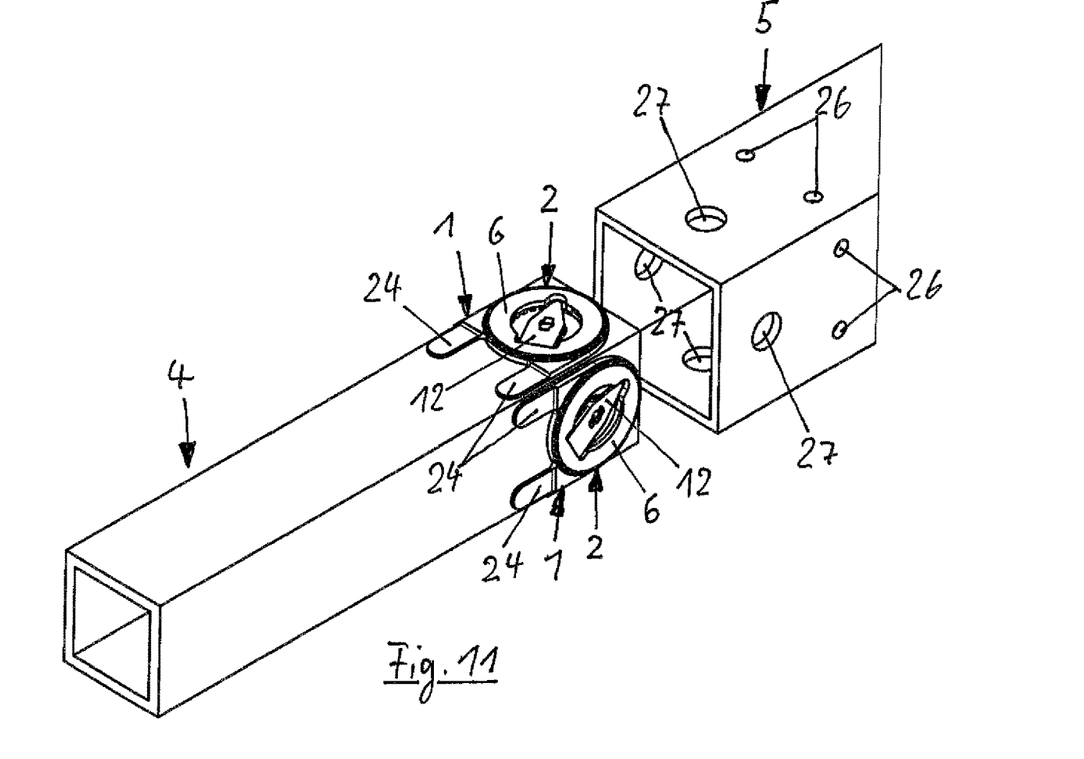
FIG. 11 shows a perspective view of an inner square tube with sliding elements fixed thereon before introduction into an outer square tube of a corresponding guide system for illustrating a first mounting step for the guide system.
Figure 12:
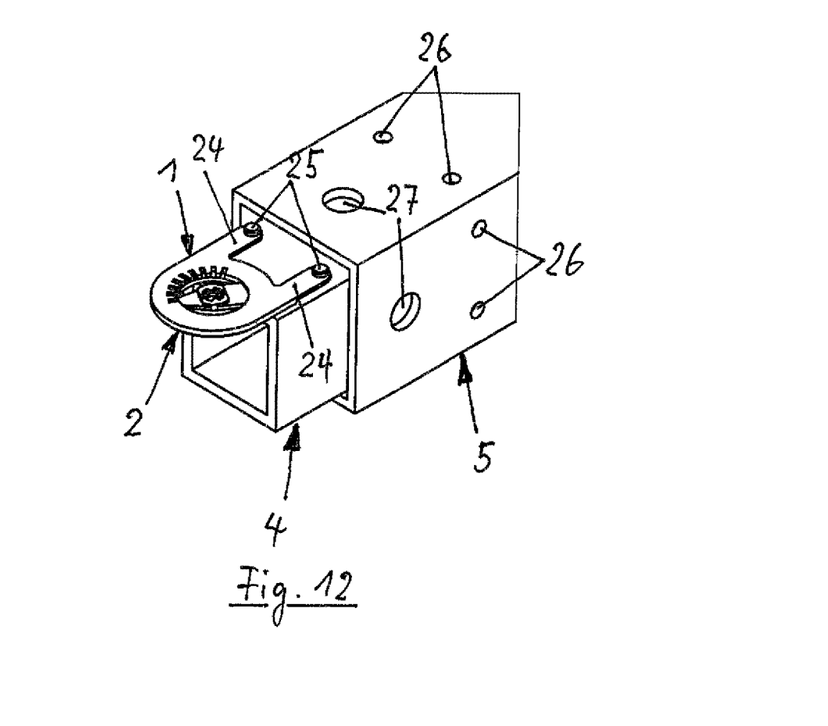
FIG. 12 shows a perspective view of the inner square tube shown in FIG. 11 inserted into the outer square tube with a sliding element arranged on the top side to illustrate a second mounting step for the guide system.

For mounting the above-described sliding elements between an inner square tube 4 and an outer square tube 5, in a first step, sliding elements can be fixed in a first end region of the inner square tube 4 at the four side walls as shown in FIG. 11 and pushed with the inner square tube 4 into the outer square tube 5. A second step involves firstly inserting between the second end region of the inner square tube 4, that is opposite to the first end region, a first sliding element whose sliding surface 6, as shown in FIG. 12, is placed on a side wall of the inner square tube 4, into the outer square tube 5 until a fixing position for fixing the sliding element with its fixing side 3 to the outer square tube 5 is reached. Thereupon fixing of the sliding element is effected insofar as the studs 25 on the bars 24 could be latched from the interior into the recesses 26 in the outer square tube 5, as shown in FIG. 13.

Figure 13:
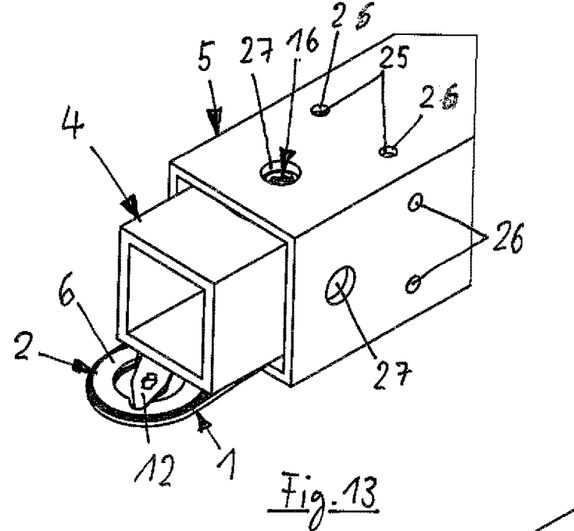
FIG. 13 shows a perspective view of the inner square tube shown in FIG. 12 inserted into the outer square tube with a sliding element arranged on the underside, to illustrate a further mounting step for the guide system.
Figure 14:
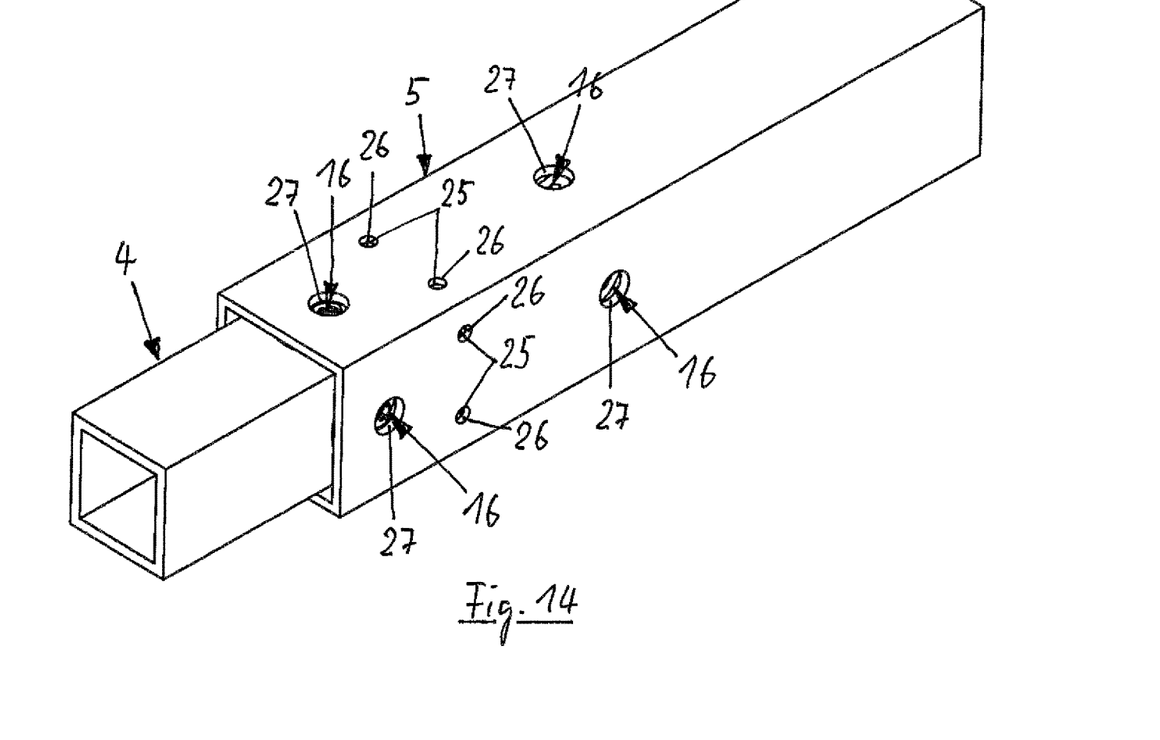
FIG. 14 shows a perspective view of the guide system with the complete arrangement of the sliding elements on the inner and outer square tubes in a displacement position of the two square tubes, in which the sliding elements fixed to the inner square tube and the sliding elements fixed to the inside of the outer square tube are adjustable in their respective overall structural height by the insertion of a tool through the through openings in the side walls of the outer square tube.
Figure 15:
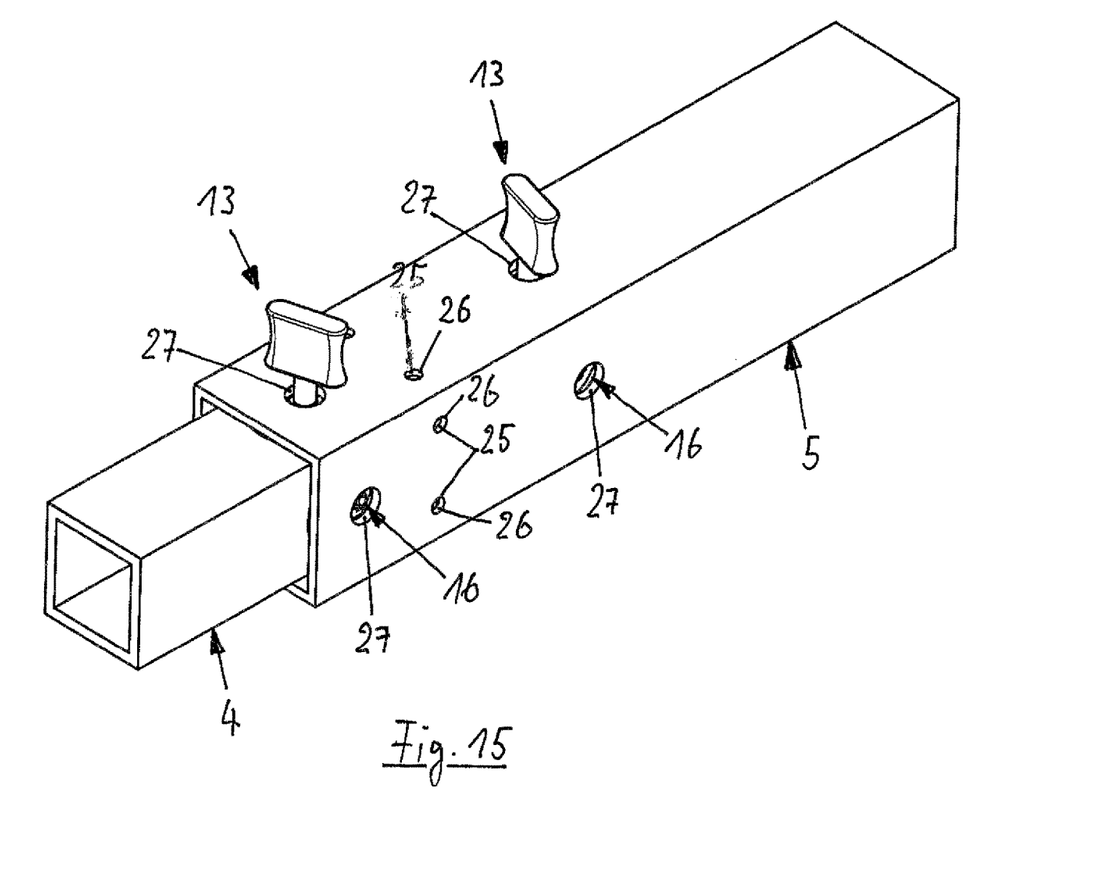
FIG. 15 shows a perspective view of the guide system of FIG. 14, with tools engaging into the through openings at the top side of the outer square tube.

As FIG. 13 also shows a further sliding element which is placed with its sliding surface 6 against a further side wall of the inner square tube 4 is then inserted like the first sliding element between the second end region of the inner square tube 4 and the outer square tube 5 until the fixing position for that sliding element at the outer square tube 5 is reached. The second sliding element is thereupon fixed to the side wall in question, like the first sliding element.

A third and a fourth sliding element are fixed to the other side walls of the outer square tube 5, as described hereinbefore for the first and second sliding elements.

For setting the overall structural height of the sliding element and for subsequent setting achieved thereby in respect of a tolerance-induced guide play between the square tubes 4 and 5 from the exterior the outer square tube 5 is provided with through openings 27 which are produced in the outer square tube 5 by simple drilling, without milling or thread-cutting processing, like also the recesses 26 provided for latching engagement of the studs 25.

The sliding elements fixed to the inner square tube 4 can be displaced with the inner square tube 4 into a position relative to the outer square tube 5, in which the engagement openings 16 in the elastic elements 12 of the sliding elements are arranged in alignment with further through openings 27 in the outer square tube 5. In that position the overall structural height of the respective sliding element fixed at a longitudinal side of the inner square tube 4 can again be adjusted by introducing a tool 13 with its engagement end in order also in this region to subsequently correct a tolerance-induced guide play from the exterior.

LIST OF REFERENCES 1 first portion
2 second portion
3 fixing side
4 inner square tube
5 outer square tube
6 sliding surface
7 contact surface
8 inclination region
9 inclination region
10 depression
11 projection
12 elastic element
13 tool
14 through opening
15 through opening
16 engagement opening
17 abutment surface
18 projection
19 handle portion
20 bar-shaped region
21 cylindrical region
22 through-passage region
23 recess
24 bar
25 stud
26 recess
27 through opening
D axis of rotation

The invention claimed is:

1. A sliding element for a guide system having two guide portions which are movable relative to each other, wherein the sliding element can be fixed with a fixing side (3) to one of the guide portions and at a side opposite the fixing side (3) has a sliding surface (6) for slidingly bearing against the other guide portion, the sliding element comprising a first portion (1) and a second portion (2) which are mounted rotatably relative to each other about an axis of rotation (D) and have a contact surface (7) for the two portions (1, 2) to bear against each other, and wherein the contact surface (7) has an axial inclination in a direction of rotation of the second portion (2) relative to the first portion (1) about the axis of rotation (D) so that by rotation of the two portions (1, 2) relative to each other the axial overall structural height of the two portions (1, 2) which bear against each other at the contact surface (7) is variable and the two portions (1, 2) upon relative rotation thereof about the axis of rotation (D) along their contact surface (7) can be arrested to each other over an adjustment angle in various angular positions and the arresting action is releasable, wherein the fixing side (3) of the sliding element for fixing to one of the guide portions is arranged at a side of the first portion (1), that faces away from the second portion (2), and the sliding surface (6) of the sliding element is arranged at a side of the second portion (2), that faces away from the first portion (1), and wherein the first portion (1) on a partial circle with respect to the axis of rotation (D) has depressions (10) or raised portions which co-operate with a projection (11) or a recess respectively on an elastic element arranged non-rotatably on the second portion (2) for releasably arresting the two portions (1, 2) in the various angular positions by a positively locking engagement.

2. The sliding element as set forth in claim 1, wherein adjacent angular positions are spaced from each other by equal angles.

3. The sliding element as set forth in claim 1, wherein the contact surface (7) has a plurality of inclination regions (8, 9) with the axial inclination.

4. The sliding element as set forth in claim 3, wherein the inclination regions (8, 9) are arranged symmetrically over a perimeter with respect to the axis of rotation (D).

5. The sliding element as set forth in claim 3, wherein there are provided two inclination regions (8, 9) which each extend in a direction of rotation about the axis of rotation (D) in mutually adjoining relationship through 180° and the contact of the two portions along each inclination region (8, 9) in each angular position extends at least over 20°.

6. The sliding element as set forth in claim 3, wherein there are provided two inclination regions (8, 9) which each extend in a direction of rotation about the axis of rotation (D) in mutually adjoining relationship through 180° and the contact of the two portions along each inclination region (8, 9) in each angular position extends at least over 60°.

7. The sliding element as set forth in claim 1, wherein the depressions (10) or raised portions of the first portion (1) and the projection (11) or the recess on the elastic element (12) of the second portion are arranged axially and the elastic element is releasable from its engagement into one of the depressions (10) or raised portions on a partial circle of the first portion (1) by bending in the axial direction.

8. The sliding element as set forth in claim 7, wherein the elastic element (12) in a bending state required for release of the engagement does not project beyond an outwardly facing end of the second portion (2).

9. The sliding element as set forth in claim 1, wherein the second portion (2) has an opening and the elastic element (12) extends in or below the opening and at a free end has the projection (11) or the depression.

10. The sliding element as set forth in claim 9, wherein the elastic element (12) arranged on the second portion (2) extends with a free end and the projection (11) provided thereon or the depression provided thereon into a recess (23) in an edge region of the opening (14) of the second portion (2).

11. The sliding element as set forth in claim 9, wherein the opening of the second portion (12) is a through opening (14)

and the first portion (1) has a through opening (15) aligning with the through opening (14) of the second portion (2).

12. The sliding element as set forth in claim 9, wherein the elastic element (12) has an engagement opening (16) which is central with respect to the axis of rotation and into which a tool (13) can be inserted for axially pushing or pulling for the purposes of releasing the engagement and rotation for the purposes of adjustment of the angular position.

13. The sliding element as set forth in claim 1, wherein the elastic element (12) is formed in one piece on the second portion (2).

14. The sliding element as set forth in claim 1, wherein the two portions (1, 2) are of a disk-shaped configuration and are mounted rotatably relative to each other by a cylindrical guide at their outer edge regions.

15. The sliding element as set forth in claim 1, wherein the sliding element is formed by the two portions (1, 2), wherein the one outwardly facing side of the portions which bear against each other at their contact surface (7) forms the sliding surface (6) of the sliding element and the outwardly facing side opposite thereto is designed for fixing on one of the guide portions.

16. The sliding element as set forth in claim 15, wherein the sliding surface (6) is arranged on the second portion (2) and the side designed for fixing on one of the guide portions is arranged on the first portion (1).

17. A sliding element for a guide system having two guide portions which are moveable relative to each other, wherein the sliding element can be fixed with a fixing side (3) to one of the guide portions and at a side opposite the fixing side (3) has a sliding surface (6) for slidingly bearing against the other guide portion, the sliding element comprising a first portion (1) and a second portion (2) which are mounted rotatably relative to each other about an axis of rotation (D) and have a contact surface (7) for the two portions (1, 2) to bear against each other, and wherein the contact surface (7) has an axial inclination in a direction of rotation of the second portion (2) relative to the first portion (1) about the axis of rotation (D) so that by rotation of the two portions (1, 2) relative to each other the axial overall structural height of the two portions (1, 2) which bear against each other at the contact surface (7) is variable and the two portions (1, 2) upon relative rotation thereof about the axis of rotation (D) along their contact surface (7) can be arrested to each other over an adjustment angle in various angular positions and the arresting action is releasable, wherein the fixing side (3) of the sliding element for fixing to one of the guide portions is arranged at a side of the first portion (1), that faces away from the second portion (2), and the sliding surface (6) of the sliding element is arranged at a side of the second portion (2), that faces away from the first portion (1), wherein the sliding element is formed by the two portions (1, 2), wherein the one outwardly facing side of the portions which bear against each other at their contact surface (7) forms the sliding surface (6) of the sliding element and the outwardly facing side opposite thereto is designed for fixing on one of the guide portions, wherein the sliding surface (6) is arranged on the second portion (2) and the side designed for fixing on one of the guide portions is arranged on the first portion (1), and wherein the second portion (2) has two resilient bars (24) and in the end regions thereof has a respective outwardly extending stud (25) which is respectively latchable in a corresponding recess (26) in the guide portion.

* * * * *